US012478926B2

(12) United States Patent
Yahagi et al.

(10) Patent No.: US 12,478,926 B2
(45) Date of Patent: Nov. 25, 2025

(54) GAS SEPARATION MEMBRANE AND GAS SEPARATION MEMBRANE MODULE

(71) Applicant: TORAY INDUSTRIES, INC., Tokyo (JP)

(72) Inventors: Nahoko Yahagi, Otsu (JP); Takaaki Mihara, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 344 days.

(21) Appl. No.: 18/029,286

(22) PCT Filed: Sep. 28, 2021

(86) PCT No.: PCT/JP2021/035507
§ 371 (c)(1),
(2) Date: Mar. 29, 2023

(87) PCT Pub. No.: WO2022/075115
PCT Pub. Date: Apr. 14, 2022

(65) Prior Publication Data
US 2023/0372881 A1    Nov. 23, 2023

(30) Foreign Application Priority Data
Oct. 5, 2020  (JP) .............................. 2020-168235

(51) Int. Cl.
| | |
|---|---|
| *B01D 53/22* | (2006.01) |
| *B01D 69/08* | (2006.01) |
| *B01D 69/10* | (2006.01) |
| *B01D 69/12* | (2006.01) |
| *B01D 69/14* | (2006.01) |
| *B01D 71/02* | (2006.01) |

(52) U.S. Cl.
CPC ............ *B01D 71/021* (2013.01); *B01D 69/08* (2013.01); *B01D 69/108* (2022.08); *B01D 69/1213* (2022.08); *B01D 69/1411* (2022.08); *B01D 2323/21819* (2022.08)

(58) Field of Classification Search
CPC .............. B01D 71/021; B01D 69/1213; B01D 69/108; B01D 69/1411; B01D 69/08; B01D 2323/21819
See application file for complete search history.

(56) References Cited

U.S. PATENT DOCUMENTS

| | | | | |
|---|---|---|---|---|
| 4,740,312 | A * | 4/1988 | Dahlquist ......... | B01D 29/6476 210/639 |
| 6,663,805 | B1 * | 12/2003 | Ekiner ................. | B01D 69/08 264/45.9 |
| 7,708,810 | B2 | 5/2010 | Foley et al. | |
| 9,216,391 | B2 | 12/2015 | Revanur et al. | |
| 10,179,314 | B2 | 1/2019 | Quan et al. | |
| 2002/0056369 | A1 | 5/2002 | Koros et al. | |
| 2003/0089227 | A1 * | 5/2003 | Hasse .................. | B01D 69/145 95/45 |
| 2006/0117949 | A1 | 6/2006 | Kulkarni et al. | |
| 2010/0018926 | A1 * | 1/2010 | Liu .................... | B01D 67/00793 95/52 |
| 2011/0168624 | A1 | 7/2011 | Wang et al. | |
| 2015/0283520 | A1 | 10/2015 | Hill et al. | |
| 2016/0158708 | A1 * | 6/2016 | Lee .................. | B01D 67/00793 95/55 |
| 2016/0263531 | A1 | 9/2016 | Odeh et al. | |

FOREIGN PATENT DOCUMENTS

| | | |
|---|---|---|
| CA | 3 112 770 A1 | 3/2020 |
| EP | 2 602 363 A1 | 6/2013 |
| EP | 2668995 A1 | 12/2013 |
| JP | 2004-514546 A | 5/2004 |
| JP | 2007-196185 A | 8/2007 |
| JP | 2016-501293 A | 1/2016 |
| JP | 2017-131882 A | 8/2017 |
| WO | WO 2009/067310 A1 | 5/2009 |
| WO | WO 2014/118639 A2 | 8/2014 |
| WO | WO 2017/068603 A1 | 4/2017 |
| WO | WO 2019/040445 A1 | 2/2019 |
| WO | WO 2020/087067 A1 | 4/2020 |
| WO | WO 2021/219887 A1 | 11/2021 |

OTHER PUBLICATIONS

International Search Report, issued in PCT/JP2021/035507, PCT/ISA/210, dated Nov. 16, 2021.
Written Opinion of the International Searching Authority, issued in PCT/JP2021/035507, PCT/ISA/237, dated Nov. 16, 2021.
Extended European Search Report for European Application No. 21877416.4, dated Sep. 24, 2024.
Mohd Sanip et al., "Functionalized Carbon Nanotubes for Mixed Matrix Membrane," IEICE Transactions on Electronics, vol. E92-C, No. 12, 2009, pp. 1427-1431.
European Communication pursuant to Article 94(3) EPC for European Application No. 21 877 416.4, dated May 20, 2025.
Liu et al., "Polymer/Carbon Nanotube Nano Composite Fibers—A Review," ACS Applied Materials & Interfaces, vol. 6, 2014, pp. 6069-6087.
Zhang et al., "Shear-aligned graphene oxide laminate/Pebax ultrathin composite hollow fiber membranes using a facile dip-coating approach," Journal of Materials Chemistry A, vol. 5, 2017, pp. 7732-7737.

* cited by examiner

*Primary Examiner* — Anthony R Shumate
(74) *Attorney, Agent, or Firm* — Birch, Stewart, Kolasch & Birch, LLP

(57) ABSTRACT

A gas separation membrane including a separation functional layer in at least part thereof, the gas separation membrane having a fibrous shape or film-like shape, the separation functional layer including a matrix and particles. Provided are a gas separation membrane and a gas separation membrane module capable of preventing breakage of the gas separation membrane during the operation, and allowing long-term stable production of excellent permeation and separation properties.

8 Claims, No Drawings

GAS SEPARATION MEMBRANE AND GAS SEPARATION MEMBRANE MODULE

TECHNICAL FIELD

The present invention relates to a gas separation membrane and a gas separation membrane module.

BACKGROUND ART

As a method of selectively separating and purifying a specific component from a mixed gas, membrane separation is known. Membrane separation is attracting attention since it utilizes the pressure difference or concentration difference to reduce consumption of thermal energy and hence to achieve energy saving compared to other separation and purification methods. However, in spite of the fact that the gas separation process requires heat resistance and chemical resistance, there have been problems in the stable supply of gas separation membranes satisfying the requirement.

PRIOR ART DOCUMENTS

Patent Documents

Patent Document 1 describes a separation membrane comprising a polymer matrix and a carbon nanotube non-woven fabric.

Patent Document 2 discloses a separation membrane comprising: carbon as a matrix; and various materials as reinforcing materials.

[Patent Document 1] JP 2014-237127 A
[Patent Document 2] Japanese Translated PCT Patent Application Laid-open No. 2011-527231

SUMMARY OF THE INVENTION

Problems to be Solved by the Invention

Although mechanical durability of the separation membrane disclosed in Patent Document 1 can be secured by reinforcing the polymer matrix with the non-woven fabric, this separation membrane has insufficient heat resistance as a gas separation membrane due to low heat resistance of the polymer matrix.

In the separation membrane disclosed in Patent Document 2, the simple combination of the matrix and the reinforcing materials is likely to promote detachment at the interface, leading to destruction during long-term operation, which results in unstable operation due to gas leakage.

An object of the present invention is to provide a gas separation membrane and a gas separation membrane module capable of preventing breakage of the gas separation membrane during the operation to allow long-term stable production of excellent permeation and separation properties.

Means for Solving the Problems

In order to achieve the above object, the gas separation membrane of the present invention has the following configuration:

a gas separation membrane comprising a separation functional layer in at least part thereof,
the gas separation membrane having a fibrous shape or film-like shape,
the separation functional layer comprising a matrix and particles.

The gas separation membrane module of the present invention has the following configuration:

a gas separation membrane module having a form in which the gas separation membrane is placed in a case.

In the gas separation membrane of the present invention, the particles preferably at least partially include particles having an aspect ratio of not less than 10.

In the gas separation membrane of the present invention, an absolute value of an orientation coefficient F, with respect to a reference axis, of the particles having an aspect ratio of not less than 10, is preferably 0.1 to 1.0.

In the gas separation membrane of the present invention, the particles preferably have a fibrous shape.

In the gas separation membrane of the present invention, the particles preferably have a flat shape.

In the gas separation membrane of the present invention, the content of particles in the separation functional layer is preferably not more than 10 vol %.

In the gas separation membrane of the present invention, the orientation coefficient F, with respect to the reference axis, of the particles having an aspect ratio of not less than 10, is preferably +0.1 to +1.0.

In the gas separation membrane of the present invention, the volume ratio of particles present independently without being in contact with other particles is preferably not less than 1 vol % to the total volume of all particles.

In the gas separation membrane of the present invention, the gas separation membrane preferably has a fibrous shape.

In the gas separation membrane of the present invention, the matrix has a ratio of the number of carbon elements of 70 atomic % to 100 atomic %; and, when the ratio of the number of carbon elements in the matrix is X (atomic %), and the ratio of the number of carbon elements in the particles is Y (atomic %), $(|X-Y|/X) \times 100$ is preferably not more than 30%.

In the gas separation membrane of the present invention, the matrix is preferably a carbide of a macromolecular compound.

In the gas separation membrane of the present invention, the particles are preferably one or more selected from the group consisting of carbon black, graphite, expanded graphite, carbon nanohorns, carbon nanoribbons, carbon nanotubes, graphene, graphene oxide, and fullerene.

Effect of the Invention

The present invention provides a gas separation membrane and a gas separation membrane module capable of suppressing breakage of the gas separation membrane to allow long-term stable production of excellent permeation and separation properties.

MODE FOR CARRYING OUT THE INVENTION

The present invention is a gas separation membrane including a separation functional layer in at least part thereof, the gas separation membrane having a fibrous shape or film-like shape, the separation functional layer including a matrix and particles.

<Gas Separation Membrane>

The gas separation membrane of the present invention comprises a separation functional layer in at least part thereof. "The gas separation membrane comprises a separation functional layer in at least part thereof" means a state where a layer-shaped portion having a separation function (separation functional layer) forms at least part of the material, wherein the portion not forming the separation functional layer may be a portion which has no separation function and which is capable of controlling the flow of the gas. The state where the flow of the gas can be controlled means a state that does not substantially allow passing of the gas, wherein the permeability is less than 0.01 nmol/(m²sPa) in terms of nitrogen gas.

The separation functional layer constituting the gas separation membrane of the present invention is composed of a matrix and particles. The matrix in the separation functional layer means the sea portion of the so-called sea-island structure. The particles in the separation functional layer means the island portion of the so-called sea-island structure. For the identification of the sea-island structure, a conventionally known method may be applied as appropriate, and any method may be selected as long as the method is capable of rational separation between the sea portion and the island portion.

The material of the matrix is not limited, and its ratio of the number of carbon elements, X, is preferably 70 atomic % to 100 atomic %. The higher the ratio of the number of carbon elements in the matrix, X, the better the membrane performance, chemical resistance, and heat resistance, which is preferred. The ratio is more preferably not less than 80 atomic %. On the other hand, the smaller the number of carbon elements, the higher the flexibility, and the higher the resistance to breakage, resulting in improved long-term durability. Thus, the ratio of the number of carbon elements in the matrix, X, is preferably not more than 99 atomic %, more preferably not more than 92 atomic %. The constituent elements other than carbon in the matrix are not limited. The matrix may contain hydrogen, oxygen, nitrogen, boron, sulfur, silicon, or the like, and may contain an alkali metal, alkaline earth metal, or the like. The ratios of the elements may be determined by various analysis methods. For example, they may be analyzed utilizing energy dispersive X-ray spectrometry.

The material of the matrix is not limited, and examples of the material include macromolecular compounds such as thermosetting resins and thermoplastic resins; and inorganic materials.

Examples of the thermoplastic resins used for the matrix herein include polyester such as polyethylene terephthalate (PET), polybutylene terephthalate (PBT), polytrimethylene terephthalate (PTT), polyethylene naphthalate (PENP), and liquid crystal polyesters; polyolefins such as polyethylene (PE), polypropylene (PP), and polybutylene; styrene resins; polyoxymethylene (POM); polyamide (PA); polycarbonate (PC); polymethylene methacrylate (PMMA); polyvinyl chloride (PVC); polyvinyl alcohol (PVA); polyphenylene sulfide (PPS); polyphenylene ether (PPE); modified PPE; polyphenylene oxide (PPO); modified PPO; polyimide (PI); polyamideimide (PAI); polyetherimide (PEI); polysulfone (PSU); modified PSU; polyethersulfone (PES); polyketone (PK); polyetherketone (PEK); polyetheretherketone (PEEK); polyetherketoneketone (PEKK); polyarylate (PAR); polyacrylonitrile (PAN); polyethernitrile (PEN); phenolic resins; phenoxy resins; and fluorine resins. Examples of the thermoplastic resins also include copolymers thereof, modified products thereof, and blended resins containing two or more thereof.

Examples of the thermosetting resins used for the matrix include unsaturated polyester resins, alkyd resins, melamine resins, urea resins, polyimide resins, diallyl phthalates resins, lignin resins, epoxy resins, and urethane resins. Examples of the thermosetting resins also include copolymers thereof, modified products thereof, and blended resins containing two or more thereof.

Examples of the inorganic materials used for the matrix include zeolite, silica, alumina, metallic materials, and carbon materials. The carbon materials are preferably carbides of macromolecular compounds from the viewpoint of enabling simple control of the ratio of the number of carbon elements in the matrix, X. Examples of the carbides of macromolecular compounds include those obtained by burning a macromolecular compound containing at least one of the thermoplastic resins and thermosetting resins described above. Phenolic resins, polyacrylonitrile, polyimide, and the like are especially preferably selected.

"Having a separation function" herein means having a function that causes gases to show different permeation rates, wherein the separation factor is not less than 1.2 in terms of the permeation rate ratio between $CO_2$ and $CH_4$ ($CO_2/CH_4$).

By the combination of the particles with the matrix, an effect that suppresses breakage of the separation functional layer can be obtained. In a preferred mode, the particles not only are capable of producing the effect that suppresses breakage of the separation functional layer, but also have a function that allows permeation of a gas, and a function that enables separation of a gas.

The material of the particles is not limited. The particles tend to show better adhesion to the matrix and improved strength as the ratio of the number of carbon elements in the particles, Y, becomes closer to the ratio of the number of carbon elements in the matrix, X. In view of this, ($|X-Y|/X)\times100$, which is an index of the closeness of the ratio of the number of carbon elements between the matrix and the particles, is preferably not more than 30%. ($|X-Y|/X)\times100$ is preferably not more than 20%, more preferably 0% to 10%. The constituent elements other than carbon herein are not limited as long as the above effects can be produced. The particles may contain oxygen, nitrogen, boron, sulfur, silicon, or the like, and may contain an alkali metal, alkaline earth metal, or the like. The amounts of the elements are determined by elementary analysis using a transmission electron microscope capable of fine-scale observation of portions of both the matrix and the particles together with application of energy dispersive X-ray spectrometry or the like, wherein the analysis is carried out under appropriate control such that signals of all elements except hydrogen element can be detected so as to enable calculation of the element ratios.

The particles used for the gas separation membrane of the present invention preferably have a ratio of the number of carbon elements Y of 60 atomic % to 100 atomic %. The higher the ratio of the number of carbon elements Y, the better the membrane performance, chemical resistance, and heat resistance, which is preferred. The ratio is more preferably not less than 70 atomic %, still more preferably not less than 80 atomic %. On the other hand, there is a tendency that the lower the ratio of the number of carbon elements, the higher the flexibility and the resistance to breakage. Since this results in an improved effect which prevents breakage of the membrane and which therefore secures the long-term durability, the ratio of the number of carbon elements in the particles, Y, is more preferably not more than 99 atomic %.

The particles used for the gas separation membrane of the present invention may be selected from various materials such as macromolecular compounds, organism-derived materials, and inorganic materials, which may be used either individually or as a combination of two or more of these. In cases where the particles according to the present invention are a macromolecular compound, examples of the macromolecular compound include polyester, polyamide, polyimide, polyether, polyphenylene sulfide, and polyetheretherketone; and copolymers containing these as major components.

The particles used for the gas separation membrane of the present invention are preferably an inorganic material. In cases where the particles are an inorganic material, the particles tend to have a high elastic modulus. Therefore, when they are combined with the matrix, they are likely to produce a reinforcing effect, and tend to have high heat resistance and chemical resistance. Examples of the inorganic material include, but are not limited to, carbon compounds such as silicon carbide, boron carbide, and carbon nitride; and materials containing carbon element as a major component. Each of these materials may be used as a complex in a state where, for example, the surface of the material is coated with carbon in order to satisfy the ratio of the number of carbon elements.

The particles in the separation functional layer constituting the gas separation membrane of the present invention are preferably one or more selected from the group consisting of carbon black, graphite, expanded graphite, carbon nanohorns, carbon nanoribbons, carbon nanotubes, graphene, graphene oxide, and fullerene. Since these materials can be easily made to have a ratio of the number of carbon elements which is close to that of the matrix, the reinforcing effect can be easily produced when they are combined with the matrix. In particular, among these materials, the particles are more preferably one or more selected from the group consisting of carbon black, carbon nanohorns, carbon nanoribbons, carbon nanotubes, graphene, graphene oxide, and fullerene from the viewpoint of the fact that a large specific surface area is likely to increase the adhesive interface at which the particles produce the reinforcing effect on the matrix constituting the separation functional layer. The particles are still more preferably one or more selected from the group consisting of carbon black, carbon nanotubes, graphene, graphene oxide, and fullerene from the viewpoint of the cost.

The particles contained in the separation functional layer according to the present invention preferably at least partially include particles having an aspect ratio of not less than 10. Since a high average aspect ratio is likely to allow the production of the combination effect of the matrix and the particles, the average aspect ratio of the particles is more preferably not less than 300, still more preferably not less than 800, especially preferably not less than 1,500. There is no need to set the upper limit of the average aspect ratio of the particles. However, from the viewpoint of easily allowing microdispersion of the particles in the separation functional layer, especially from the viewpoint of allowing, when a liquid is used to form the separation functional layer, formation of a uniform separation functional layer while securing fluidity of the liquid, the average aspect ratio of the particles in the separation functional layer is preferably not more than 2,000. The aspect ratio herein is calculated by extracting one particle dispersed in the matrix by three-dimensional microscopic imaging, and determining the ratio between the length of the shortest portion Ls and the length of the longest portion Ll (Ll/Ls) based on three-dimensional data of the particle. The length of the shortest portion Ls generally corresponds, for example, to the thickness of the thinnest portion in cases of graphene, and to the diameter of the thinnest portion in cases of a carbon nanotube. In cases of graphene, the length of the longest portion Ll is measured by extracting the portion in which the longest edge-to-edge distance can be measured in the flat shape. In cases of a carbon nanotube, Ll corresponds to the length from one end to the other end of one winding carbon nanotube. The three-dimensional microscopic imaging is not limited as long as it enables separation between, and observation of, the matrix and the particles. It is preferred to appropriately select an analysis method that enables separation between, and observation and analysis of, the matrix and the particles as electronic information, and examples of such a method include slice & view, in which observation under a scanning electron microscope is carried out continuously while creating cross-sections using an ion beam, and a method based on application of computerized tomography using a transmission electron microscope.

The shape of the particles according to the present invention is not limited. The particles preferably have a fibrous shape or flat shape.

Fibrous particles tend to be oriented in the flow direction in cases where a step of applying the particles using a liquid is employed during the formation of the separation functional layer. With such an orientation of the particles, the layer shows improved strength in specific directions, especially in the fiber axis direction, and improved flexural rigidity in the direction orthogonal to the fiber axis, which is preferred. Examples of the fibrous particles include cellulose nanofibers, carbon nanohorns, carbon nanoribbons, carbon nanotubes, synthetic resin fibers, glass fibers, carbon fibers, silicon carbide fibers, metal fibers, and whiskers.

Flat-shaped particles tend to be plane-oriented in the flow direction in cases where a step of applying the particles using a liquid is employed during the formation of the separation functional layer. In cases where the orientation direction is the MD direction, the layer is likely to show improved strength in the MD direction and the TD direction, which is preferred. Examples the flat-shaped particles include graphene, graphene oxide, talc, and mica.

In cases where the separation functional layer according to the present invention comprises particles having an aspect ratio of not less than 10, the absolute value of the orientation coefficient F, with respect to a reference axis, of the particles having an aspect ratio of not less than 10, is preferably 0.1 to 1.0. In a preferred mode, the particles are oriented in a specific direction since, in this case, the reinforcing effect is likely to be produced by the combination with the matrix. In this case, the direction in which the particles are to be oriented is arbitrary, but it is preferred to design the production method such that the particles are oriented in the direction for which the reinforcing effect is required to the largest extent. In cases where a method using a liquid to form the separation functional layer is selected, an arbitrary orientation state can be set by forming the separation functional layer while allowing the liquid to flow along the set orientation direction.

The orientation coefficient F of the particles in the separation functional layer according to the present invention is as follows: $F=(3\cos^2\varphi-1)/2$. $\varphi$ is the orientation angle. Focusing on the above-described one particle extracted by the three-dimensional microscopic imaging of the separation functional layer, three-dimensional data of the particle are approximately fitted to an ellipsoid using the least square method, and the long axis of the resulting ellipsoid is defined as D. In cases where the gas separation membrane of the present invention has a fibrous shape, the fiber axis is used as the reference axis, and the orientation angle $\varphi$ is calculated from the projected length $D\cos\varphi$ of the long axis D of the ellipsoid with respect to the reference axis. In cases where the gas separation membrane of the present invention has a film-like shape, the normal of the film surface is used as the reference axis, and the long axis of the resulting ellipsoid is defined as D. The ellipsoid is rotated at 90° from the long axis D, in the direction of the shortest short axis of the ellipsoid based on the center of the ellipsoid, followed by calculation of the orientation angle φ from the projected length D cos φ of the long axis D of the ellipsoid with respect to the reference axis.

The orientation coefficient F can quantitatively represent the orientation state of the particle, wherein a value of +1.0 corresponds to total orientation; a value of −0.5 corresponds to perpendicular orientation; and a value of 0.0 corresponds to non-orientation.

The orientation coefficient F herein is calculated for particles having an aspect ratio of not less than 10. Ten arbitrary particles having an aspect ratio of not less than 10 are extracted, and the orientation coefficient is calculated for each particle with respect to the same reference axis. The orientation coefficient F is defined as the average of the 10 resulting values.

In cases where the gas separation membrane of the present invention has a fibrous shape, when the particles in the separation functional layer are oriented in the separation functional layer, fiber fracture caused by generation of a tensile force on the separation functional layer due to, for example, vibration of the gas flow during the operation can be suppressed. Thus, the absolute value of the orientation coefficient F of the particles with respect to the reference axis is preferably 0.1 to 1.0, more preferably 0.2 to 1.0.

In cases where the gas separation membrane of the present invention has a film-like shape, when the particles in the separation functional layer are oriented in the separation functional layer, rupture caused by generation of a tensile force on the separation functional layer due to, for example, vibration of the gas flow during the operation can be suppressed. Thus, the absolute value of the orientation coefficient F, with respect to a reference axis, of the particles is preferably 0.1 to 1.0, more preferably 0.2 to 1.0.

In cases where the gas separation membrane of the present invention has a fibrous shape, the orientation coefficient F, with respect to a reference axis, of the particles is preferably +0.1 to +1.0. The higher the orientation coefficient F, the more the particles are oriented in the fiber axis direction that is the reference axis, with respect to the reference axis, so that the reinforcing effect on the separation functional layer by the particles is more likely to be produced, and an excellent reinforcing effect especially in the tensile direction of the fibers can be produced. Therefore, a gas separation membrane which enables long-term stable operation while preventing breakage and fiber fracture can be provided, which is preferred. Thus, the orientation coefficient F is more preferably +0.2 to +1.0, still more preferably +0.5 to +1.0, especially preferably +0.65 to +1.0.

In cases where the gas separation membrane of the present invention has a film-like shape, the orientation coefficient F, with respect to a reference axis, of the particles is preferably +0.1 to +1.0. The higher the orientation coefficient F, the more the particles are oriented in the reference axis with respect to the reference axis, so that the reinforcing effect on the separation functional layer by the particles is more likely to be produced, and an excellent reinforcing effect especially against an external force from the direction of the normal of the film surface can be produced. Therefore, a gas separation membrane which enables a long-term stable operation while preventing breakage can be provided, which is preferred. Thus, the orientation coefficient F is more preferably +0.2 to +1.0, still more preferably +0.5 to +1.0, especially preferably +0.65 to +1.0.

In the separation functional layer constituting the gas separation membrane of the present invention, the elastic modulus of the particles is preferably higher than the elastic modulus of the matrix. In cases where the elastic modulus of the particles is higher than the elastic modulus of the matrix, an effect that prevents destruction of the separation functional layer is produced by their combination. Therefore, an effect that prevents breakage during the operation as the gas separation membrane can be obtained to enable long-term stable operation.

"The elastic modulus of the particles is higher than the elastic modulus of the matrix" herein means that the ratio of the elastic modulus of the particles to the elastic modulus of the matrix (hereinafter referred to as elastic modulus ratio) is within the range of 10 to 20,000. The higher the elastic modulus of the particles, the more likely the reinforcing effect is to be obtained, so that the breakage can be prevented. On the other hand, the lower the elastic modulus of the particles, the more flexibly deformation can occur to reduce instant impact forces. Thus, the elastic modulus ratio is more preferably 200 to 15,000.

Regarding the elastic modulus ratio, elastic modulus mapping analysis by atomic force microscopy is carried out for a cross-section of the separation functional layer, to obtain an elastic modulus mapping image by observation of an area of 1 μm×1 μm. The elastic modulus ratio is defined from the ratio of the elastic modulus between the point showing the highest elastic modulus and the point showing the lowest elastic modulus in this image. The point showing the lowest elastic modulus and forming the sea is defined as the elastic modulus of the matrix. Different sites in not less than 10 samples are observed, and the elastic modulus ratios obtained by analysis of the observation sites are averaged to determine the elastic modulus ratio according to the present invention.

The surface of the particles used in the present invention may be chemically modified with carboxyl groups, amide groups, and/or the like since, in such cases, adhesiveness to the matrix can be further improved by chemical bonds, which is preferred. On the other hand, the less surface functional groups the particles have, the higher chemical resistance the particles have. Thus, the ratio of O=C—O components derived from carboxyl groups and O=C—N components derived from amide bonds to the total bound components of carbon element is preferably 0.1% to 30%.

The particles in the separation functional layer constituting the gas separation membrane of the present invention may be either a single kind of particles or a combination of two or more kinds of particles. In cases where two or more kinds of particles are used in combination, the particles preferably include particles having an aspect ratio of not less than 10. The larger the amount of the particles having an aspect ratio of not less than 10 included, the more likely the combination effect of the matrix and the particles is to be obtained, which is preferred. More preferably, the content of the particles having an aspect ratio of not less than 10 included is not less than 50 vol %, still more preferably not less than 80 vol %, with respect to the total volume of all particles, which is taken as 100 vol %.

In the separation functional layer constituting the gas separation membrane of the present invention, the volume ratio of particles present distantly from other particles is preferably not less than 1 vol %, more preferably not less than 5 vol %, to the total volume of all particles. In cases where the volume ratio of the particles present independently without being in contact with other particles is within the preferred range described above, the combination effect of the matrix and the particles is likely to be obtained.

In the gas separation membrane of the present invention, the volume ratio of the particles present independently without being in contact with other particles is determined by identifying particles present independently without being in contact with other particles from the above-described three-dimensional data of particles extracted by the three-dimensional microscopic imaging of the separation functional layer, and calculating the volume percentage (vol %) of the identified particles. In view of the presence of variation, data including 10 or more particles are used. In cases where a single set of data does not include 10 or more particles, data obtained from another observation field are added thereto, and observation of the separation functional layer is carried out such that not less than 10 particles are included to calculate the volume percentage (vol %).

The particles present independently without being in contact with other particles preferably include particles having an aspect ratio of not less than 10 from the viewpoint of easily increasing the adhesive interface at which the reinforcing effect on the matrix constituting the separation functional layer is produced by the particles.

Although the size of the particles in the separation functional layer is not limited, the length of the shortest portion Ls is preferably 0.3 nm to 10 μm. In cases where Ls is not less than 0.3 nm, the the gas separation membrane can be easily handled while a sufficient specific surface area can be secured. On the other hand, in cases where Ls is not more than 10 μm, adhesiveness to the matrix can be improved due to a large specific surface area, so that the separation membrane can have improved strength. According to the point of view described above, Ls of the particles is preferably 0.3 nm to 1 μm, more preferably 1 nm to 100 nm.

Although the content of the particles in the separation functional layer constituting the gas separation membrane of the present invention is not limited, the content is preferably not more than 10 vol % with respect to 100 vol % of the separation functional layer from the viewpoint of obtaining a sufficient reinforcing effect on the matrix. In cases where the particle content is low, dispersibility of the particles in the matrix is improved, so that a separation functional layer showing excellent uniformity in the membrane thickness can be obtained in some cases. On the other hand, in cases where the content is high, the particle content per unit volume of the separation functional layer increases, so that the reinforcing effect is likely to be produced to improve strength of the separation functional layer in some cases. From these points of view, the content of the particles in the separation functional layer is more preferably 0.3 to 9 vol %, still more preferably 0.5 to 5 vol %.

Here, the content of the particles in the separation functional layer constituting the gas separation membrane of the present invention is determined based on the above-described three-dimensional data of particles extracted by the three-dimensional microscopic imaging of the separation functional layer, wherein the volume ratio of the particles in the volume of the separation functional layer in the observation field is defined as the content (vol %) of the particles in the separation functional layer.

The thickness of the separation functional layer constituting the gas separation membrane of the present invention is not limited. As the thickness increases, the separation membrane becomes more resistant to breakage due to external forces, so that the separation membrane can be stably used for a long period, which is preferred. As the thickness decreases, permeation resistance to a fluid can be reduced, so that the throughput per unit area can be increased, which is preferred. From these points of view, the thickness of the separation functional layer is preferably within the range of 100 nm to 1,000 μm, more preferably within the range of 200 nm to 10 μm. Here, the thickness of the separation functional layer is defined by measuring the thickness of the thinnest portion constituting the separation functional layer under the microscope or the like, and calculating the average thickness based on analysis of 10 cross-sections of the gas separation membrane.

The gas separation membrane of the present invention may be the so-called composite membrane, which comprises, in addition to the separation functional layer, a support that supports the separation functional layer. In the composite membrane, the support that supports the separation functional layer secures mechanical strength and durability to prevent breakage during the actual use, and hence to enable long-term stable operation. Moreover, upon the application of a high pressure, the support effectively receives the pressure, so that a gas separation membrane that enables operation under a high-pressure environment can be provided.

The support herein is not limited as long as it is a material which does not prevent gas permeation, and which has a function to support the separation functional layer. A conventionally known porous material may be appropriately selected as the support. Examples of porous materials suitable as the support include materials having closed cells derived from the sea-island structure, materials having a structure in which a plurality of particles are linked together, non-woven fabrics comprising fibrous materials which are folded together and, when necessary, moderately adhering to each other, and materials having a continuous porous structure in which voids and the substance constituting the support are present continuously with each other. These materials are preferably appropriately selected from the viewpoint of not preventing permeation of a fluid, and from the viewpoint of producing the function to support the separation functional layer. In particular, materials having a continuous porous structure are more preferred because of the fact that, since the voids and the substance constituting the support are present continuously with each other, permeation of the gas is not prevented, and the substance constituting the support highly effectively disperses the stress caused by the pressure applied to the separation functional layer, resulting in increased pressure resistance of the gas separation membrane.

The shape of the gas separation membrane of the present invention is not limited, and may be an arbitrary shape such as a fibrous shape or film shape. In cases where the shape of the gas separation membrane is a fibrous shape, there are advantages in, for example, that the membrane area per unit volume can be increased relative to that of the film shape. Further, since resistance to the force applied in the cross-sectional direction increases, operation at high pressure is possible, so that gas membrane separation can be carried out with high efficiency, which is preferred.

In cases where the shape of the gas separation membrane of the present invention is a fibrous shape, the shape of the fiber cross-section is not limited, and may be an arbitrary shape such as a circular cross-section; a multilobed cross-section such as a triangular cross-section; a flat cross-section; or a hollow cross-section. In particular, in cases where the cross-section of the gas separation membrane is a hollow cross-section, in other words, in cases where the gas separation membrane has a hollow-fiber shape, pressure resistance can be imparted while controlling the flow of the gas to be supplied and the gas after the separation, which is preferred. In cases where the gas separation membrane has a hollow-fiber shape, as the hollow ratio increases, the pressure loss decreases, so that the gas flow is not disturbed. As the hollow ratio decreases, the pressure resistance increases, which is preferred. From these points of view, the hollow ratio is preferably within the range of 10 to 90%, more preferably within the range of 20 to 60%. In the hollow fiber, either a single hollow section or a plurality of hollow sections may be formed.

The gas separation membrane module of the present invention has a form in which the gas separation membrane module of the present invention is placed in a case. In the gas separation membrane module, a channel(s) for controlling the flow of the mixed gas and guiding the gas that has permeated through the gas separation membrane is/are formed. Further, a case, a sealing material, and/or the like is/are preferably used for the purpose of controlling these gas flows. The material of the case is not limited. The material is preferably appropriately selected in accordance with the use environment regarding the pressure resistance, heat resistance, and the like. Examples of the material include metals, resins, carbon, and their complexes.

EXAMPLES

The present invention is described below in detail by way of Examples and Comparative Examples. However, the present invention is not limited to these. Evaluation in each Example or Comparative Example was carried out by the following method.

(Gas Separation Membrane Module)

Twenty gas separation membranes having a length of 10 cm were combined together, and placed in an acrylic pipe (inner diameter, 12 mm; wall thickness, 3 mm), which was used as a case. The ends of the combined fluid separation membranes were immobilized on the inner surface of the case using an epoxy resin adhesive, and both ends of the case were sealed to prepare a gas separation membrane module.

(Rupture Rate of Gas Separation Membrane According to Pressurization-Depressurization Test)

For each of Examples and Comparative Examples, five gas separation membrane modules were provided, which modules had been confirmed to have no rupture in their gas separation membranes caused during the preparation. The presence or absence of rupture in the gas separation membrane was evaluated as follows. When rupture of the gas separation membrane was visually found through the acrylic pipe which was used as the case, the gas separation membrane was judged to have rupture. In cases where no rupture was visually found, all inlets/outlets of the gas separation membrane module for the gas to be separated were sealed except for one inlet/outlet, and the whole gas separation membrane module was immersed in water in a state where a pressurized air of 0.2 MPaG was supplied from the unsealed inlet/outlet for the gas to be separated. In cases where air bubbles were generated from the opening of the gas separation membrane, the gas separation membrane was judged to have rupture. In cases where no generation of air bubbles was found, the gas separation membrane was judged not to have rupture.

A pressurization-depressurization test was carried out by 10 sets of operations wherein each set of operation was carried out by keeping for 1 minute each gas separation membrane module having no rupture in a state where a pressurized air of 2.0 MPaG was supplied to the supply side, and then releasing the pressure to atmospheric pressure. The presence or absence of rupture of the gas separation membrane was judged again after the pressurization-depressurization test, wherein the ratio of the number of modules having rupture out of the five gas separation membrane modules was defined as the rupture rate of the gas separation membrane.

(Rate of Decrease in Separation Factor Due to Pressurization-Depressurization Test)

The gas permeation rate of the gas separation membrane module before the pressurization-depressurization test was measured, and the separation factor was calculated based on the permeation rate ratio between $CO_2$ and $CH_4$ ($CO_2/CH_4$). Subsequently, a pressurization-depressurization test was carried out. From the gas separation membrane modules that were found to have no rupture caused by the pressurization-depressurization test, one module was arbitrarily selected, and subjected to measurement of the gas permeation rate again to calculate the separation factor. The rate of decrease in the separation factor due to the pressurization-depressurization test was calculated as follows: 1−(separation factor after pressurization-depressurization test/separation factor before pressurization-depressurization test). In cases where the rate of decrease in the separation factor was less than 0.1, the module was rated as "excellent"; in cases where the rate of decrease was not less than 0.1 and less than 0.3, the module was rated as "good"; and, in cases where the rate of decrease was not less than 0.3, the module was rated as "fair".

Regarding the gas permeation rate, pressure changes of $CO_2$ and $CH_4$ in the permeate side per unit time were measured by the external-pressure method at a measurement temperature of 25° C. according to the pressure sensor method of JIS K 7126-1 (2006). Here, the pressure difference between the supply side and the permeate side was set to 0.11 MPa (82.5 cmHg). Subsequently, the permeation rate Q of the permeate gas was calculated according to the following equation, and the separation factor α was calculated as the ratio of the permeation rate of each gas component. STP means standard conditions. The membrane area was calculated from the outer diameter and the length of the fluid separation membrane in the area that contributes to the gas permeation.

Permeation rate $Q$=[gas permeation flow volume $(cm^3 \cdot STP)$]/[membrane area $(cm^2)$×time (s)× pressure difference (cmHg)].

The ratio between the gas permeation rates Q of $CO_2$ and $CH_4$ (permeation rate of $CO_2$/permeation rate of $CH_4$) was calculated as the separation factor α.

[Preparation Example 1] Preparation of 10.0 wt % Aromatic Polyimide (PI) Solution and Slurry The aromatic polyimide (hereinafter referred to as aromatic PI) "Matrimid (registered trademark)" 5218 was dissolved in N-methylpyrrolidone (NMP), to prepare 10.0 wt % aromatic polyimide solution (hereinafter referred to as aromatic PI solution).

Here, "Matrimid (registered trademark)" 5218 is a condensation product of 3,3',4,4'-benzophenonetetracarboxylic dianhydride and 5(6)-amino-1-(4'-aminophenyl)-1,3,3'-trimethylindane).

To the aromatic PI solution prepared, a carbon nanotube powder (FT7000 series, manufactured by CNano) was added to 0.30 vol %, and a dispersant was further added thereto, followed by stirring the resulting mixture to allow dispersion using a rotation-revolution mixer, to prepare a slurry.

[Preparation Example 2] Preparation of 10.0 wt % Polyacrylonitrile (PAN) Solution and Slurry Polyacrylonitrile (PAN) (MW, 150,000) was dissolved in dimethyl sulfoxide (DMSO), to prepare 10.0 wt % PAN solution.

To the PAN solution prepared, a carbon nanotube powder (FT7000 series, manufactured by CNano) was added to 0.35 vol %, and a dispersant was further added thereto, followed by stirring the resulting mixture to allow dispersion using a rotation-revolution mixer, to prepare a slurry.

[Preparation Example 3] Preparation of 10.0 wt % Cellulose Acetate Solution and Slurry Cellulose acetate (degree of acetylation, 55%) was dissolved in N-methylpyrrolidone (NMP), to prepare 10.0 wt % cellulose acetate solution.

To the cellulose acetate solution prepared, chopped fibers of polyethylene terephthalate (PET) were added to 0.40 vol %, and a dispersant was further added thereto, followed by stirring the resulting mixture to allow dispersion using a rotation-revolution mixer, to prepare a slurry.

[Preparation Example 4] Preparation of 8.0 wt % Aromatic PI Solution and Slurry

The aromatic PI "Matrimid (registered trademark)" 5218 was dissolved in N-methylpyrrolidone (NMP), to prepare 8.0 wt % aromatic PI solution.

To the aromatic PI solution prepared, a carbon nanotube powder (FT7000 series, manufactured by CNano) was added to 0.03 vol %, and a dispersant was further added thereto, followed by stirring the resulting mixture to allow dispersion using a rotation-revolution mixer, to prepare a slurry.

Example 1

Ten parts by weight of polyacrylonitrile (PAN) (MW, 150,000), 10 parts by weight of polyvinylpyrrolidone (PVP) (MW, 40,000), and 80 parts by weight of dimethyl sulfoxide (DMSO) were mixed together, and the resulting mixture was stirred at 100° C. to prepare a spinning solution.

The spinning solution obtained was cooled to 25° C. Thereafter, using a concentric triple-orifice spinneret, 80 wt % aqueous DMSO solution, the spinning liquid, and 90 wt % aqueous DMSO solution were discharged at the same time from the inner pipe, middle pipe, and outer pipe, respectively, and guided into a coagulation bath, followed by being wound onto a roller, to obtain a raw fiber. The raw fiber was then dried using a circulation-type hot-air dryer, to prepare a precursor for a porous carbon support having a hollow-fiber shape.

Subsequently, the precursor for a porous carbon support was passed into an electric furnace, and heated in an air atmosphere to perform infusibilization treatment. Subsequently, the infusibilized fiber was subjected to carbonization treatment, to prepare a porous carbon support having a hollow-fiber shape. The porous carbon support prepared showed openings formed on both the outer surface and the inner surface (hollow-portion surface). Further, as a result of observation of a cross-section of the hollow fiber, a co-continuous porous structure was found.

The porous carbon support was immersed in the slurry prepared in Preparation Example 1, and then pulled up at a rate of 10 mm/minute by the dip coating method, followed by removing the solvent by immersion in water and drying using a circulation-type hot-air dryer, to obtain a coated fiber in which an aromatic PI containing a carbon nanotube is layered on the surface of the porous carbon support. The coated fiber was further subjected to carbonization treatment at 700° C. to prepare a gas separation membrane in which a carbon film using as a precursor the aromatic PI containing the carbon nanotube is layered on the surface of the porous carbon support.

In this case, according to three-dimensional data acquired by three-dimensional microscopic imaging of the separation functional layer of the gas separation membrane, the content of the particles was 3.1 vol %; the average aspect ratio of the particles was 1,725; the orientation coefficient F, with respect to a reference axis, of the particles having an aspect ratio of not less than 10, was +0.76; the absolute value of the orientation coefficient F, with respect to a reference axis, of the particles having an aspect ratio of not less than 10, was 0.76; the volume ratio of the particles having an aspect ratio of not less than 10 was 98%; and the volume ratio of the particles present independently without being in contact with other particles was 43 vol %. Here, regarding the average aspect ratio, 10 particles present independently without being in contact with other particles were arbitrarily selected, and the aspect ratio was determined for each of these particles, followed by calculating their average as the average aspect ratio. According to elementary analysis by an energy dispersive X-ray spectrometer attached to the transmission electron microscope, the ratio of the number of carbon elements in the matrix, X, was 90.3%, and the ratio of the number of carbon elements in the particles, Y, was 98.6%. As a result, $(|X-Y|/X) \times 100$ was 9.2%.

The rupture rate of the gas separation membrane according to the pressurization-depressurization test was 0, and the rate of decrease in the separation factor due to the pressurization-depressurization test was "excellent". The evaluation results are shown in Table 1.

TABLE 1

|  |  | Example 1 | Example 2 | Example 3 | Example 4 | Example 5 | Example 6 |
|---|---|---|---|---|---|---|---|
| Matrix | Raw Material | Aromatic PI | Aromatic PI | Aromatic PI | PAN | Cellulose Acetate | Aromatic PI |
|  | Ratio of the Number of Carbon Element X (%) | 90.3 | 90.3 | 86.4 | 78.2 | 61.4 | 90.3 |
| Particles | Type | CNT | CNT | CNT | CNT | PET fiber | CB |
|  | Ratio of the Number of Carbon Element Y (%) | 98.6 | 98.5 | 98.7 | 98.5 | 71.6 | 99.1 |

TABLE 1-continued

|  |  | Example 1 | Example 2 | Example 3 | Example 4 | Example 5 | Example 6 |
|---|---|---|---|---|---|---|---|
|  | Average Aspect Ratio | 1725 | 1648 | 1773 | 1680 | 1592 | 6 |
|  | Absolute Value of Orientation Coefficient F of the Particles | 0.76 | 0.78 | 0.57 | 0.54 | 0.55 | 0.08 |
|  | Orientation Coefficient F of the Particles | +0.76 | +0.78 | +0.57 | +0.54 | +0.55 | +0.08 |
|  | Content of Particles in the Separation Functional Layer (volume %) | 3.1 | 0.2 | 3.7 | 3.4 | 4.2 | 2.9 |
|  | Ratio of Particles having Aspect Ratio of 10 or more (volume %) | 98 | 97 | 99 | 98 | 97 | 3 |
|  | Ratio of Particles present Independently (volume %) | 43 | 35 | 39 | 36 | 31 | 35 |
| Gas Separation Membrane Property Effects | ($|X - Y|/X$) × 100(%) | 9.2 | 9.1 | 14.2 | 26.0 | 16.6 | 9.7 |
|  | Rupture Rate of Gas Separation Membrane (%) | 0.0 | 0.2 | 0.0 | 0.2 | 0.2 | 0.6 |
|  | Decrease Rate of Separation Coefficient | Exellent | Good | Good | Good | Fair | Fair |

Example 2

A gas separation membrane module was prepared by the same method as in Example 1 except that, in the preparation of the slurry in Preparation Example 1, the carbon nanotube powder was added to 0.02 vol %.

In this case, according to three-dimensional data acquired by three-dimensional microscopic imaging of the separation functional layer, the content of the particles was 0.2 vol %; the average aspect ratio of the particles was 1,648; the orientation coefficient F, with respect to a reference axis, of the particles having an aspect ratio of not less than 10, was +0.78; the absolute value of the orientation coefficient F, with respect to a reference axis, of the particles having an aspect ratio of not less than 10, was 0.78; the volume ratio of the particles having an aspect ratio of not less than 10 was 97%; and the volume ratio of the particles present independently without being in contact with other particles was 35 vol %. According to elementary analysis by an energy dispersive X-ray spectrometer attached to the transmission electron microscope, the ratio of the number of carbon elements in the matrix, X, was 90.3%, and the ratio of the number of carbon elements in the particles, Y, was 98.5%. As a result, ($|X-Y|/X$)×100 was 9.1%.

The rupture rate of the gas separation membrane according to the pressurization-depressurization test was 0.2, and the rate of decrease in the separation factor due to the pressurization-depressurization test was "good". The evaluation results are shown together in Table 1.

Example 3

A gas separation membrane module was prepared by the same method as in Example 1 except that the pulling rate in the dip coating method was 5 mm/minute, and that the carbonization treatment temperature for the coated fiber was 600° C.

In this case, according to three-dimensional data acquired by three-dimensional microscopic imaging of the separation functional layer, the content of the particles was 3.7 vol %; the average aspect ratio of the particles was 1,773; the orientation coefficient F, with respect to a reference axis, of the particles having an aspect ratio of not less than 10, was +0.57; the absolute value of the orientation coefficient F, with respect to a reference axis, of the particles having an aspect ratio of not less than 10, was 0.57; the volume ratio of the particles having an aspect ratio of not less than 10 was 99%; and the volume ratio of the particles present independently without being in contact with other particles was 39 vol %. According to elementary analysis by an energy dispersive X-ray spectrometer attached to the transmission electron microscope, the ratio of the number of carbon elements in the matrix, X, was 86.4%, and the ratio of the number of carbon elements in the particles, Y, was 98.7%. As a result, ($|X-Y|/X$)×100 was 14.2%.

The rupture rate of the gas separation membrane according to the pressurization-depressurization test was 0.0, and the rate of decrease in the separation factor due to the pressurization-depressurization test was "good". The evaluation results are shown together in Table 1.

Example 4

A gas separation membrane module was prepared by the same method as in Example 1 except that the slurry prepared in Preparation Example 2 rather than Preparation Example 1 was used, that the pulling rate in the dip coating method was 5 mm/minute, and that the carbonization treatment temperature for the coated fiber was 600° C.

In this case, according to three-dimensional data acquired by three-dimensional microscopic imaging of the separation functional layer, the content of the particles was 3.4 vol %; the average aspect ratio of the particles was 1,680; the orientation coefficient F, with respect to a reference axis, of the particles having an aspect ratio of not less than 10, was +0.54; the absolute value of the orientation coefficient F, with respect to a reference axis, of the particles having an aspect ratio of not less than 10, was 0.54; the volume ratio of the particles having an aspect ratio of not less than 10 was 98%; and the volume ratio of the particles present independently without being in contact with other particles was 36 vol %. According to elementary analysis by an energy dispersive X-ray spectrometer attached to the transmission electron microscope, the ratio of the number of carbon elements in the matrix, X, was 78.2%, and the ratio of the number of carbon elements in the particles, Y, was 98.5%. As a result, ($|X-Y|/X$)×100 was 26.0%.

The rupture rate of the gas separation membrane according to the pressurization-depressurization test was 0.2, and the rate of decrease in the separation factor due to the pressurization-depressurization test was "good". The evaluation results are shown together in Table 1.

Example 5

A gas separation membrane module was prepared by the same method as in Example 1 except that the slurry prepared in Preparation Example 3 rather than Preparation Example 1 was used, that the pulling rate in the dip coating method was 5 mm/minute, and that the coated fiber was used as it is as the gas separation membrane without carrying out the carbonization treatment.

In this case, according to three-dimensional data acquired by three-dimensional microscopic imaging of the separation functional layer, the content of the particles was 4.2 vol %; the average aspect ratio of the particles was 1,592; the orientation coefficient F, with respect to a reference axis, of the particles having an aspect ratio of not less than 10, was +0.55; the absolute value of the orientation coefficient F, with respect to a reference axis, of the particles having an aspect ratio of not less than 10, was 0.55; the volume ratio of the particles having an aspect ratio of not less than 10 was 97%; and the volume ratio of the particles present independently without being in contact with other particles was 31 vol %. According to elementary analysis by an energy dispersive X-ray spectrometer attached to the transmission electron microscope, the ratio of the number of carbon elements in the matrix, X, was 61.4%, and the ratio of the number of carbon elements in the particles, Y, was 71.6%. As a result, $(|X-Y|/X) \times 100$ was 16.6%.

The rupture rate of the gas separation membrane according to the pressurization-depressurization test was 0.2, and the rate of decrease in the separation factor due to the pressurization-depressurization test was "fair". The evaluation results are shown together in Table 1.

Example 6

A gas separation membrane module was prepared by the same method as in Example 1 except that, in the preparation of the slurry in Preparation Example 1, a carbon black powder was added instead of the carbon nanotube powder.

In this case, according to three-dimensional data acquired by three-dimensional microscopic imaging of the separation functional layer, the content of the particles was 2.9 vol %; the average aspect ratio of the particles was 6; the orientation coefficient F, with respect to a reference axis, of the particles having an aspect ratio of not less than 10, was +0.08; the absolute value of the orientation coefficient F, with respect to a reference axis, of the particles having an aspect ratio of not less than 10, was 0.08; the volume ratio of the particles having an aspect ratio of not less than 10 was 3%; and the volume ratio of the particles present independently without being in contact with other particles was 35 vol %. According to elementary analysis by an energy dispersive X-ray spectrometer attached to the transmission electron microscope, the ratio of the number of carbon elements in the matrix, X, was 90.3%, and the ratio of the number of carbon elements in the particles, Y, was 99.1%. As a result, $(|X-Y|/X) \times 100$ was 9.7%.

The rupture rate of the gas separation membrane according to the pressurization-depressurization test was 0.6, and the rate of decrease in the separation factor due to the pressurization-depressurization test was "fair". The evaluation results are shown together in Table 1.

Example 7

A gas separation membrane module was prepared by the same method as in Example 1 except that, in the preparation of the slurry in Preparation Example 1, a powder prepared by mixing the carbon nanotube and carbon black at a weight ratio of 2:1 was added instead of the carbon nanotube powder.

In this case, according to three-dimensional data acquired by three-dimensional microscopic imaging of the separation functional layer, the content of the particles was 3.4 vol %; the average aspect ratio of the particles was 1,173; the orientation coefficient F, with respect to a reference axis, of the particles having an aspect ratio of not less than 10, was +0.48; the absolute value of the orientation coefficient F, with respect to a reference axis, of the particles having an aspect ratio of not less than 10, was 0.48; the volume ratio of the particles having an aspect ratio of not less than 10 was 73%; and the volume ratio of the particles present independently without being in contact with other particles was 30 vol %. According to elementary analysis by an energy dispersive X-ray spectrometer attached to the transmission electron microscope, the ratio of the number of carbon elements in the matrix, X, was 90.3%, and the ratio of the number of carbon elements in the particles, Y, was 98.7%. As a result, $(|X-Y|/X) \times 100$ was 9.3%.

The rupture rate of the gas separation membrane according to the pressurization-depressurization test was 0.2, and the rate of decrease in the separation factor due to the pressurization-depressurization test was "good". The evaluation results are shown in Table 2.

TABLE 2

|  |  | Example 7 | Example 8 | Example 9 | Example 10 | Example 11 | Comparative Example 1 |
|---|---|---|---|---|---|---|---|
| Matrix | Raw Material | Aromatic PI | Aromatic PI | Aromatic PI | Aromatic PI | Aromatic PI | Aromatic PI |
|  | Ratio of the Number of Carbon Element X (%) | 90.3 | 90.3 | 90.3 | 90.3 | 90.3 | 90.3 |
| Particles | Type | CNT/CB | CNT/CB | CNT | CNT | Graphene | No Particle |
|  | Ratio of the Number of Carbon Element Y (%) | 98.7 | 98.7 | 98.5 | 98.6 | 98.1 | — |
|  | Average Aspect Ratio | 1173 | 655 | 1581 | 1624 | 592 | — |
|  | Absolute Value of Orientation Coefficient F of the Particles | 0.48 | 0.43 | 0.18 | 0.54 | 0.62 | — |
|  | Orientation Coefficient F of the Particles | +0.48 | +0.43 | +0.18 | +0.54 | +0.62 | — |
|  | Content of Particles in the Separation Functional Layer (volume %) | 3.4 | 3.0 | 0.4 | 8.3 | 3.2 | — |
|  | Ratio of Particles having Aspect Ratio of 10 or more (volume %) | 73 | 38 | 98 | 99 | 97 | — |

TABLE 2-continued

| | | Example 7 | Example 8 | Example 9 | Example 10 | Example 11 | Comparative Example 1 |
|---|---|---|---|---|---|---|---|
| Gas Separation Membrane Property Effects | Ratio of Particles present Independently (volume %) | 30 | 3.6 | 39 | 0.7 | 38 | — |
| | (\|X − Y\|/X) × 100(%) | 9.3 | 9.3 | 9.1 | 9.2 | 8.6 | — |
| | Rupture Rate of Gas Separation Membrane (%) | 0.2 | 0.4 | 0.4 | 0.4 | 0.0 | 1.0 |
| | Decrease Rate of Separation Coefficient | Good | Good | Exellent | Good | Good | — |

Example 8

A gas separation membrane module was prepared by the same method as in Example 1 except that, in the preparation of the slurry in Preparation Example 1, a powder prepared by mixing the carbon nanotube and carbon black at a weight ratio of 1:2 was added instead of the carbon nanotube powder, and that the stirring/dispersion during the preparation of the slurry was carried out using a homogenizer instead of the rotation-revolution mixer.

In this case, according to three-dimensional data acquired by three-dimensional microscopic imaging of the separation functional layer, the content of the particles was 3.6 vol %; the average aspect ratio of the particles was 655; the orientation coefficient F, with respect to a reference axis, of the particles having an aspect ratio of not less than 10, was +0.08; the absolute value of the orientation coefficient F, with respect to a reference axis, of the particles having an aspect ratio of not less than 10, was 0.08; the volume ratio of the particles having an aspect ratio of not less than 10 was 3%; and the volume ratio of the particles present independently without being in contact with other particles was 35 vol %. According to elementary analysis by an energy dispersive X-ray spectrometer attached to the transmission electron microscope, the ratio of the number of carbon elements in the matrix, X, was 90.3%, and the ratio of the number of carbon elements in the particles, Y, was 98.7%. As a result, (|X−Y|/X)×100 was 9.3%.

The rupture rate of the gas separation membrane according to the pressurization-depressurization test was 0.4, and the rate of decrease in the separation factor due to the pressurization-depressurization test was "good". The evaluation results are shown together in Table 2.

Example 9

A gas separation membrane module was prepared by the same method as in Example 1 except that the slurry prepared in Preparation Example 4 rather than Preparation Example 1 was used, and that the pulling rate in the dip coating method was 2 mm/minute.

In this case, according to three-dimensional data acquired by three-dimensional microscopic imaging of the separation functional layer, the content of the particles was 0.4 vol %; the average aspect ratio of the particles was 1,581; the orientation coefficient F, with respect to a reference axis, of the particles having an aspect ratio of not less than 10, was +0.18; the absolute value of the orientation coefficient F, with respect to a reference axis, of the particles having an aspect ratio of not less than 10, was 0.18; the volume ratio of the particles having an aspect ratio of not less than 10 was 98%; and the volume ratio of the particles present independently without being in contact with other particles was 39 vol %. According to elementary analysis by an energy dispersive X-ray spectrometer attached to the transmission electron microscope, the ratio of the number of carbon elements in the matrix, X, was 90.3%, and the ratio of the number of carbon elements in the particles, Y, was 98.5%. As a result, (|X−Y|/X)×100 was 9.1%.

The rupture rate of the gas separation membrane according to the pressurization-depressurization test was 0.4, and the rate of decrease in the separation factor due to the pressurization-depressurization test was "excellent". The evaluation results are shown together in Table 2.

Example 10

A gas separation membrane module was prepared by the same method as in Example 1 except that a higher weight of the carbon nanotube powder was added in the preparation of the slurry in Preparation Example 1, and that the stirring/dispersion during the preparation of the slurry was carried out using a homogenizer instead of the rotation-revolution mixer.

In this case, according to three-dimensional data acquired by three-dimensional microscopic imaging of the separation functional layer, the content of the particles was 8.3 vol %; the average aspect ratio of the particles was 1,624; the orientation coefficient F, with respect to a reference axis, of the particles having an aspect ratio of not less than 10, was +0.54; the absolute value of the orientation coefficient F, with respect to a reference axis, of the particles having an aspect ratio of not less than 10, was 0.54; the volume ratio of the particles having an aspect ratio of not less than 10 was 99%; and the volume ratio of the particles present independently without being in contact with other particles was 0.7 vol %. According to elementary analysis by an energy dispersive X-ray spectrometer attached to the transmission electron microscope, the ratio of the number of carbon elements in the matrix, X, was 90.3%, and the ratio of the number of carbon elements in the particles, Y, was 98.6%. As a result, (|X−Y|/X)×100 was 9.2%.

The rupture rate of the gas separation membrane according to the pressurization-depressurization test was 0.4, and the rate of decrease in the separation factor due to the pressurization-depressurization test was "good". The evaluation results are shown together in Table 2.

Example 11

A gas separation membrane module was prepared by the same method as in Example 1 except that, in the preparation of the slurry in Preparation Example 1, a graphene powder was added instead of the carbon nanotube powder.

In this case, according to three-dimensional data acquired by three-dimensional microscopic imaging of the separation functional layer, the content of the particles was 3.2 vol %; the average aspect ratio of the particles was 592; the orientation coefficient F, with respect to a reference axis, of the particles having an aspect ratio of not less than 10, was +0.62; the absolute value of the orientation coefficient F, with respect to a reference axis, of the particles having an aspect ratio of not less than 10, was 0.62; the volume ratio of the particles having an aspect ratio of not less than 10 was 97%; and the volume ratio of the particles present independently without being in contact with other particles was 38 vol %. According to elementary analysis by an energy dispersive X-ray spectrometer attached to the transmission electron microscope, the ratio of the number of carbon elements in the matrix, X, was 90.3%, and the ratio of the number of carbon elements in the particles, Y, was 98.1%. As a result, $(|X-Y|/X) \times 100$ was 8.6%.

The rupture rate of the gas separation membrane according to the pressurization-depressurization test was 0.0, and the rate of decrease in the separation factor due to the pressurization-depressurization test was "good". The evaluation results are shown together in Table 2.

Comparative Example 1

A gas separation membrane module was prepared by the same method as in Example 1 except that the solution in Preparation Example 1 was prepared without addition of the carbon nanotube powder.

In this case, no particle was found to be included in the three-dimensional data acquired by the three-dimensional microscopic imaging of the separation functional layer.

The rupture rate of the gas separation membrane according to the pressurization-depressurization test was 1.0, indicating that all of the five gas separation membrane modules prepared were evaluated as "having rupture" in the gas separation membrane. Thus, separation of the gas was impossible, and the separation factor after the pressurization-depressurization test could not be evaluated. The evaluation results are shown together in Table 2.

INDUSTRIAL APPLICABILITY

The gas separation membrane module of the present invention enables suppression of rupture of the gas separation membrane during the operation of the gas separation membrane module, without deteriorating the gas separation function. The use of the module of the present invention is not limited. Preferred examples of uses of the module include systems for separation/storage of carbon dioxide from exhaust gases of power plants, blast furnaces, and the like; removal of sulfur components from gasified fuel gases in integrated coal gasification combined cycle power generation; purification of biogases and natural gases; and purification of hydrogen from organic hydrides.

The invention claimed is:

1. A gas separation membrane comprising a separation functional layer in at least part thereof,
    wherein the gas separation membrane has a fibrous shape or film shape,
    wherein the separation functional layer comprises a matrix and particles,
    wherein the matrix is a carbide of a macromolecular compound,
    wherein the particles at least partially include particles having an aspect ratio of not less than 10, and
    wherein an orientation coefficient F, with respect to a reference axis, of the particles having an aspect ratio of not less than 10, is +0.1 to +1.0.

2. The gas separation membrane according to claim 1, wherein the particles have a fibrous shape.

3. The gas separation membrane according to claim 1, wherein the particles have a flat shape.

4. The gas separation membrane according to claim 1, wherein a content of the particles in the separation functional layer is not more than 10 vol %.

5. The gas separation membrane according to claim 1, wherein a volume ratio of the particles present independently without being in contact with other particles is not less than 1 vol % to a total volume of all particles.

6. The gas separation membrane according to claim 1, wherein
    the matrix has a ratio of the number of carbon elements of 70 atomic % to 100 atomic %; and
    when the ratio of the number of carbon elements in the matrix is X (atomic %), and the ratio of the number of carbon elements in the particles is Y (atomic %), $(|X-Y|/X) \times 100$ is not more than 30%.

7. The gas separation membrane according to claim 1, wherein the particles are one or more selected from the group consisting of carbon black, graphite, expanded graphite, carbon nanohorns, carbon nanoribbons, carbon nanotubes, graphene, graphene oxide, and fullerene.

8. A gas separation membrane module having a form in which the gas separation membrane according to claim 1 is placed in a case.

* * * * *